(No Model.)
M. MOSKOWITZ.
ELECTRICAL CAR LIGHTING.
No. 577,872. Patented Mar. 2, 1897.
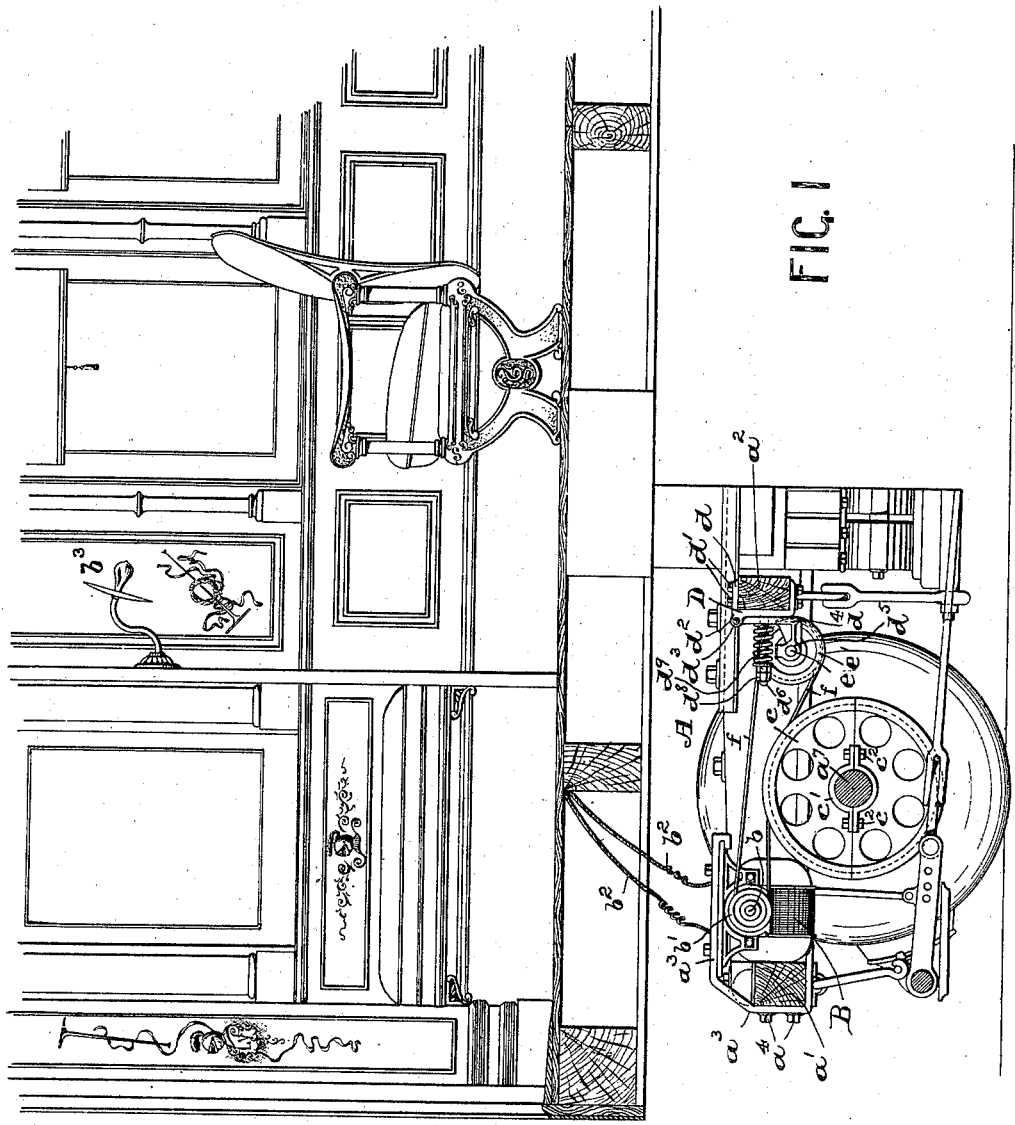
WITNESSES:
INVENTOR:
MORRIS MOSKOWITZ,
BY
Fred'k C. Fraentzel,
ATTORNEY

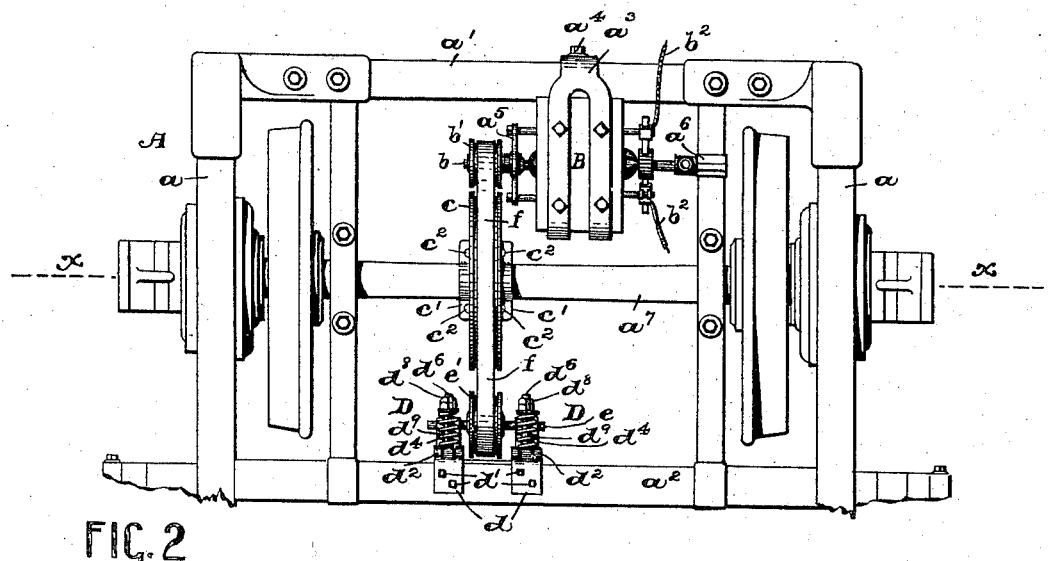

UNITED STATES PATENT OFFICE.

MORRIS MOSKOWITZ, OF NEWARK, NEW JERSEY, ASSIGNOR TO THE NATIONAL ELECTRIC CAR LIGHTING COMPANY, OF WEST VIRGINIA.

ELECTRICAL CAR-LIGHTING.

SPECIFICATION forming part of Letters Patent No. 577,872, dated March 2, 1897.

Application filed December 23, 1896. Serial No. 616,704. (No model.)

*To all whom it may concern:*

Be it known that I, MORRIS MOSKOWITZ, a citizen of the United States, residing at Newark, in the county of Essex and State of New Jersey, have invented certain new and useful Improvements in Means for Generating Electricity from a Car-Wheel Axle; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to an improved arrangement of a dynamo secured to a car-truck and a novel means for connecting said dynamo with a car-wheel axle of the truck and a belt for driving the dynamo when the car is in motion, said belt being in operative frictional contact with the upper surface of a pulley-wheel on the car-wheel axle.

The invention, which consists, primarily, in the nature of an improvement of the construction and arrangement of a means for generating electricity from a car-wheel axle shown and described in my previous Letters Patent, No. 564,336, and issued July 21, 1896, has for its primary object to do away with the additional parts of mechanism and the extra belt shown and described in said patent, and to provide an arrangement of parts in which, when it becomes necessary to remove the car-wheel axle for repairs to the wheels or other parts connected therewith, said axle can be quickly removed by dropping it from under the connecting dynamo-belt without in the least disturbing the positions of the other parts of the mechanism or cutting or unlacing the belt.

In the construction and arrangement of the parts illustrated in my previous Letters Patent hereinabove mentioned I have found by practical tests that when a car-wheel axle has to be removed for repairs and then replaced by a new axle, as is the custom in railway service, too much time is consumed in rearranging the belts connecting the axle with the dynamo-pulley, and that the belts, which are often rearranged by workmen unskilled in that line of work, would be improperly placed in position and the whole device, perhaps, rendered useless. In the construction illustrated and described herein I entirely overcome these serious objections by the employment of but one belt arranged over the dynamo-pulley and a pulley on a shaft arranged in spring-actuated bearings, said belt being in operative frictional contact with the upper portion of a pulley-wheel on the car-wheel axle, from which the belt is driven when the car is in motion and which can be removed from its operative contact with the belt when the car-wheel axle is dropped out of its bearing-boxes without in the least disturbing the said belt, and another car-wheel axle and pulley thereon can be readily put in position in the bearing-boxes of the car-truck, with the pulley-wheel on said axle immediately beneath the belt for driving the dynamo and in operative contact with said belt.

The invention therefore consists in the novel arrangements and combinations of parts to be hereinafter fully described, and finally embodied in the clauses of the claim.

The invention is illustrated in the accompanying sheets of drawings, in which—

Figure 1 is a sectional view of portions of a railway-car and one of its trucks, said view illustrating in side elevation one form of dynamo, a bracket provided with automatically-adjustable bearings having a shaft rotatively arranged therein and a pulley-wheel on said shaft, a pulley-wheel on the car-wheel axle, and a belt arranged over the dynamo-pulley and the pulley on the counter-shaft, with the surface of said belt in operative frictional contact with the upper portion of the pulley on the car-wheel axle. Fig. 2 is a plan view of a portion of the car-truck and of the dynamo and mechanism for operating the same from the car-wheel axle. Fig. 3 is a vertical cross-section taken on line $x$ in said Fig. 2, and Fig. 4 is a detail view of the counter-shaft and its bearings.

Similar letters of reference are employed in all of the above-described views to indicate corresponding parts.

In said drawings, A indicates the car-truck; $a$, the equalizing-bars; $a'$, the cross-beams at the ends of the truck, and $a^2$ are other crossbeams, which are connected with the equalizing-bars $a$ in any well-known manner.

As will be seen more especially from Figs. 1 and 2, the dynamo B, which may be of any of the well-known forms of construction, is supported in a suitable frame or bracket $a^3$, which is secured to the end of the beam $a'$ by means of suitable bolts $a^4$ or in any other suitable manner. The armature-shaft $b$ of said dynamo is supported and rotates in suitable supports $a^5$ and $a^6$, as clearly illustrated in Figs. 2 and 3. Said armature-shaft $b$ is provided with a pulley-wheel $b'$, and $b^2$ are the circuit-wires, which extend from the dynamo to suitable lamps $b^3$ or other electrical translating devices on or in the body of the car.

Upon the car-wheel axle $a^7$ I have arranged a pulley-wheel $c$, which is preferably made in halves and is provided with suitable flanges $c'$ and bolts $c^2$, whereby the two halves can be secured together and firmly clamped in the desired position upon the car-wheel axle, as will be clearly evident.

Secured directly to the cross-beam $a^2$ of the car-truck A are a pair of brackets D, as will be clearly seen from an inspection of Figs. 1, 2, and 4. Each bracket consists, essentially, of a main or body portion $d$, made to embrace the cross-beam $a^2$ and secured thereto by means of suitable bolts $d'$. At or near the upper edge of each bracket are perforated ears or lugs $d^2$, in each pair of which is a bolt or pin $d^3$. Pivotally arranged on said bolts or pins are certain bearing-plates $d^4$, provided with the bearings $d^5$, in which is rotatively arranged a counter-shaft $e$, having a pulley-wheel $e'$ suitably arranged and secured thereon, substantially as illustrated. As will be seen from Fig. 2, said pulley-wheel $e'$ on the shaft $e$, pulley-wheel $c$ on the car-wheel axle, and pulley-wheel $b'$ of the dynamo are all in alinement, whereby but one belt $f$ is necessary for the operation of the dynamo, said belt being arranged to pass around the two pulley-wheels $c$ and $b'$ and having its surface in operative frictional contact with the upper portion of the pulley-wheel $c$ on the car-wheel axle, which causes the operation of the dynamo when the car is moving.

To maintain the proper tautness of the belt $f$ I have provided the body portion $d$ of each bracket D with the forwardly-extending posts $d^6$, which pass through suitable openings $d^7$ in the pivoted bearing-plates $d^4$. On the free ends of said posts $d^6$ are adjusting-nuts $d^8$, and encircling said posts $d^6$ and arranged between said nuts and the plates $d^4$ are suitable springs $d^9$, which can be suitably compressed by said nuts $d^8$ to cause said plates $d^4$ to incline forwardly, and when the car-wheel axle is arranged in its operative position beneath the car, with the pulley-wheel $c$ on said axle in position beneath the belt $f$, the result will be that the said springs will at all times maintain the proper tautness of the belt and any vibratory motion of the car-wheel axle in its bearings will be compensated for by the spring-actuated bearing-plates $d^4$, whereby an operative connection for driving the dynamo arranged on a car-truck from a car-wheel axle will be the result.

The operation of the several parts is practical and in construction very simple, and a noiselessly-operating mechanism has thus been provided for operating a dynamo from a rotating car-wheel axle.

Of course it will be understood that I may use in connection with the said dynamo and its circuits any of the well-known forms and constructions of pole-changers, acting automatically or otherwise, whereby the current generated by the said dynamo can be made to travel in either direction, according to the direction of the travel of the car.

Having thus described my invention, what I claim is—

1. The combination, with a car-wheel axle and truck-frame, of a dynamo on said frame, having an armature-shaft and a pulley-wheel thereon, a pulley-wheel on said car-wheel axle, and a counter-shaft in brackets secured to the car-truck, a pulley-wheel on said counter-shaft, all of said pulley-wheels being in alinement, and a belt passing around the dynamo-pulley and the pulley on said counter-shaft, and in frictional contact with the upper surface of the pulley-wheel on the car-wheel axle, said pulley-wheel on the car-wheel axle being adapted to be removed without moving the belt, substantially as and for the purposes set forth.

2. The combination, with a car-wheel axle and truck-frame, of a dynamo on said frame, a pulley-wheel on said car-wheel axle, said dynamo having an armature-shaft and a pulley-wheel thereon, brackets D on said frame, pivotally arranged and spring-actuated bearing-plates on said brackets, a shaft and pulley wheel connected with said bearing-plates, all of said pulley-wheels being in alinement, and a belt passing around said dynamo-pulley and pulley on the counter-shaft connected with said bearing-plates, and said belt passing over the upper portion of the pulley on the car-wheel axle in frictional contact therewith, said pulley-wheel on the car-wheel axle being adapted to be removed without moving the belt, substantially as and for the purposes set forth.

3. The combination, with a car-wheel axle and truck-frame, of a dynamo on said frame, a pulley-wheel on said car-wheel axle, a bracket D on said frame, a swinging bearing-plate $d^4$ on said bracket, a shaft $e$, a pulley-wheel $e'$ on said shaft, and a belt $f$, passing over the upper surface of said pulley-wheel on the car-wheel axle, said pulley-wheel on the said car-wheel axle being adapted to be removed without moving the belt, substantially as and for the purposes set forth.

4. The combination, with a car-wheel axle and truck-frame, of a dynamo on said frame, a pulley-wheel on said car-wheel axle, a pair of brackets D on said frame, each comprising, a main or body portion $d$ and means for securing the same to the truck-frame, ears or lugs on said portion $d$, bearing-plates $d^4$ pivotally arranged on bolts or pins in said ears or lugs, bearings on said plates, a shaft in said bearings, a pulley-wheel on said shaft, and a belt $f$, and means connected with each bracket D to maintain the proper tautness of said belt, consisting of posts $d^6$ on said body portions $d$ extending through openings in said plates $d^4$, adjusting-nuts on the ends of said posts, and springs encircling said posts, all arranged, substantially as and for the purposes set forth.

5. The combination, with a car-wheel axle and truck-frame, of a dynamo on said frame, a pulley-wheel $c$ made in halves, and having flanges $c'$ and bolts $c^2$ for securing said halves in position on said car-wheel axle, a pair of brackets D on said frame, each comprising, a main or body portion $d$ and means for securing the same to the truck-frame, ears or lugs on said portion $d$, bearing-plates $d^4$ pivotally arranged on bolts or pins in said ears or lugs, bearings on said plates, a shaft in said bearings, a pulley-wheel on said shaft, and a belt $f$, and means connected with each bracket D to maintain the proper tautness of said belt, consisting of posts $d^6$ on said body portions $d$ extending through openings in said plates $d^4$, adjusting-nuts on the ends of said posts, and springs encircling said posts, all arranged, substantially as and for the purposes set forth.

In testimony that I claim the invention set forth above I have hereunto set my hand this 15th day of December, 1896.

MORRIS MOSKOWITZ.

Witnesses:
DAVID B. GERRETT,
MARY L. ALLEN.